Figure 2:
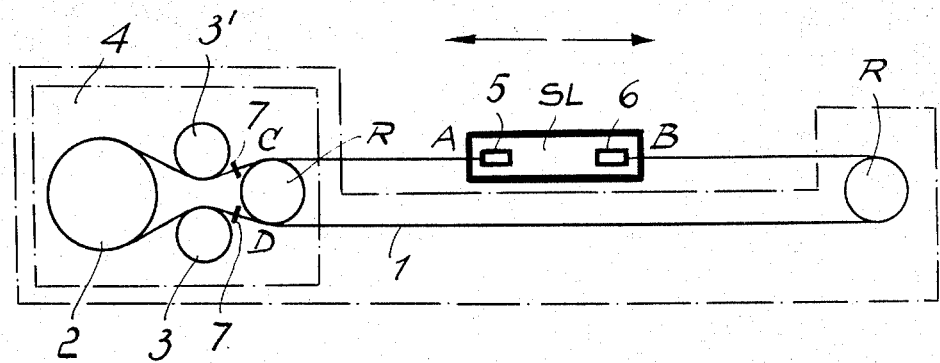

United States Patent [19]
Giacomello et al.

[11] 3,777,577
[45] Dec. 11, 1973

[54] SYSTEM OF MECHANICAL COUPLING FOR PILOTING ROTATIVE TRANSDUCERS

[76] Inventors: Giacomo Giacomello, via Domenichino 50; Andrea Pedrazzini, via Crimea 11; Luciano Franzolini, via Trezzo d'Adda 8, all of Milano, Italy

[22] Filed: Apr. 6, 1972

[21] Appl. No.: 241,595

[30] Foreign Application Priority Data
April 15, 1971 Italy..........................932264/71

[52] U.S. Cl. .............................. 74/89.22, 74/231 M
[51] Int. Cl............................................ F16h 27/02
[58] Field of Search....................... 74/89.22, 89.21, 74/231 M

[56] References Cited
UNITED STATES PATENTS

| | | | |
|---|---|---|---|
| 1,140,890 | 5/1915 | Eloesser | 74/231 M |
| 3,728,066 | 4/1973 | Stadler | 74/231 M |
| 3,403,474 | 10/1968 | Spasoff | 74/89.22 |
| 3,388,604 | 6/1968 | MacFarland et al. | 74/89.22 |
| 3,616,705 | 11/1971 | Platz | 74/89.22 |

*Primary Examiner*—Charles J. Myhre
*Assistant Examiner*—Wesley S. Ratliff, Jr.
*Attorney*—Toren & McGeady

[57] ABSTRACT

A system of mechanical coupling comprising as essential members: a smooth tape, slipping, and a rotary pinion having a smooth surface, on which the tape is wrapped through an arc of less than 360°, the tape having a rectangular cross section with a surface area smaller than 1 square millimeter and a breadth which is within the range of 10 to 20 times the thickness, and the pinion having a diameter as great as hundred times the thickness of the tape, the ends of the tape being connected either to the ends of the movable member of a machine or the like, the position or the displacements thereof being desired to be noted through a transducer, or with two stationary points of the machine, while the block comprising the pinion and the transducer coupled thereto, is fastened respectively, either to a stationary portion of the machine or the like, or on a movable portion of the machine, so as to embody, without continuity breakage, a coupling system for the transduction of linear and polar displacements and magnitudes, into angular displacements and magnitudes, through a high degree of linearity in the relationship between the two displacements or magnitudes.

6 Claims, 4 Drawing Figures

PATENTED DEC 11 1973
3,777,577
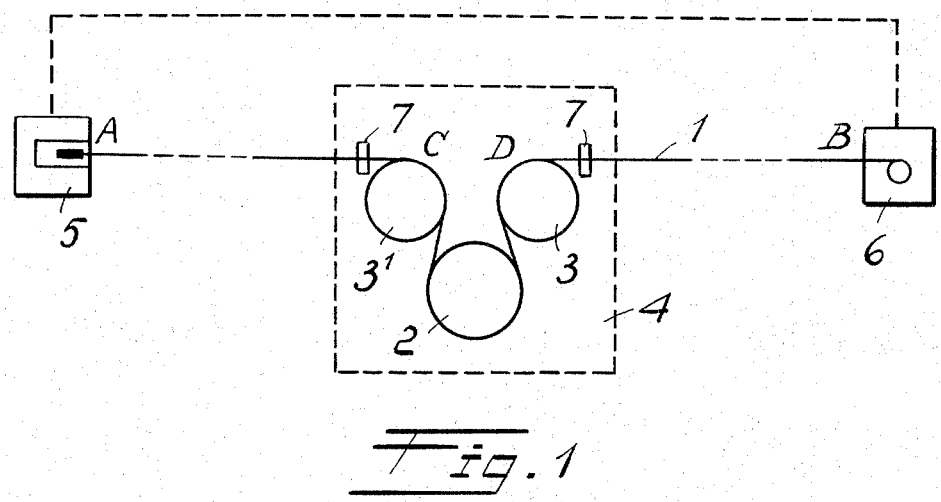
Fig. 1
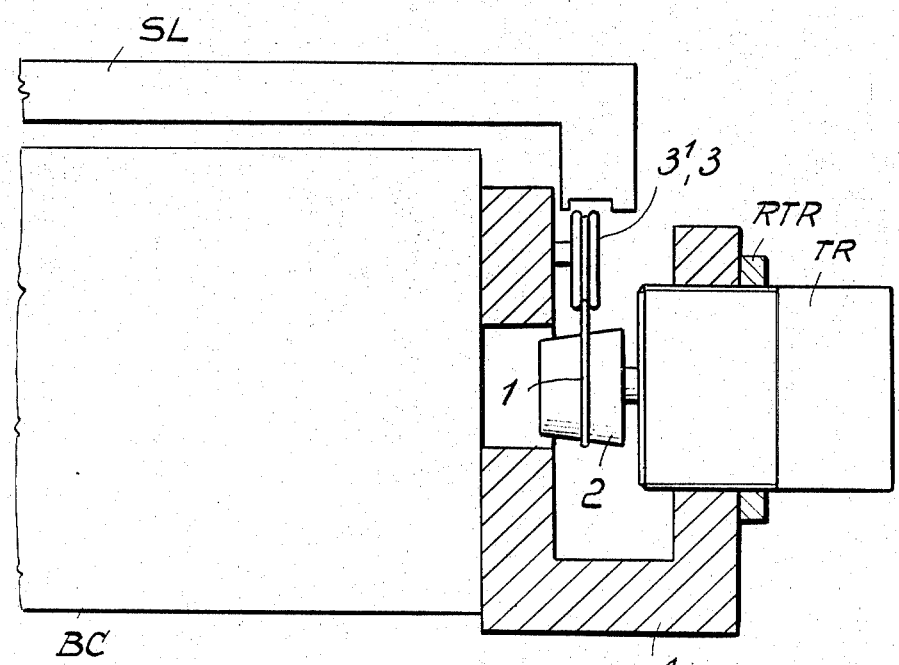
Fig. 1/A

SYSTEM OF MECHANICAL COUPLING FOR PILOTING ROTATIVE TRANSDUCERS

It is known that the mechanical coupling of a transducer upon a fixed member with respect to a mobile member and vice-versa, (to obtain, by means of digit and/or analog, or the like, with high accuracy and reproducibility the measure — through linear or polar sizes — of the reciprocal position of both the members and/or their displacement depending upon the coupling system used), is the main cause of the measurement errors, above all as far as the linearity of the extant relation between the movement of a member and that one, angular, of the transducer coupled thereto is concerned.

The principle which is at the base of the present invention comprises the assumption that "whenever does not exist any breakage of continuity about the mechanical coupling system, under special conditions of the coupled members, any displacement and of whichever size may be transducted without errors, into angular movement, therefore keeping constant and linear the relation extant between the two movements."

What above being said previously, then as a title merely of example and not of limitation, there are taken into consideration some of the more known and common mechanical coupling systems for rotary transducers, showing the more prominent advantages and inconveniences of them.

A. Pinion/rack coupling.

This system has the advantage of accepting high accelerations and retardations (starting or stopping represented by a steep slope because of impacts) and of being slightly subject to wear.

The drawbacks are as follows: the difficulty of the assemblage and equipment of the mobile member in such a manner that the pinion/rack coupling gives rise to a constant and linear coincidence of the relevant pitch lines (especially very hard in the case of many series connected rack lengths); the difficulty of getting by an accuracy better than 0,01 mm. in the division and with suitable shapes for the evolvent for the accuracy required in the continuous linear or angular transduction, in the space of a tooth, racks having a length greater than 250 millimeters.

In spite of what above, this system, through special measures which allow the amendation within certain limits of the absence of linearity which is inherent in the system, is being utilized preferably as a system for precision coupling.

The working principle of the instant invention could be applied to this coupling system (A) under the limit condition: $P/N = 0$ which finds a real solution only for $N = \infty$ wherein $P$ represents the pitch circumference of the coupling and $N$ is the number of the teeth.

In this manner the coupling would occur between a pinion converted into a tangential cylinder and a rack as a smooth plane (Pinion and rack with teeth having a modulus $= \to 0$, that is tending to zero. Said tangency on only generatrix of the cylinder, at the limit may be considered as a coupling without breakage of the continuity as from the informatory principle. Virtually, however, it is difficult to practice both the diameter $= P$ with the necessary accuracy and to get the coupling with enough guarantee of non slipping between both the coupled members when there is extant very high accelerations.

In the case there is utilized a round pinion having longitudinal cone frustum shape — in the order of amending P — in the attempt of reaching the precise transduction relationship, then the slipping matter would degenerate in that the mechanical coupling instead of interesting a generatrix of the cone, is interesting only a point or a small section thereof.

Recently, there have come around on the market attempts of practicing tangency coupling between a cylindrical or cone frustum pinion with stiff bars having a flat or round cross section which are affected through conspicuous limitations indeed because of the high specific unitary load needed at the point of coupling in order to decrease the risk of slippage during very strong accelerations.

B. Coupling by means of strings, lines, strands or the like.

This kind of mechanical coupling for rotary transducers is utilized where there are not required especial features of linearity of the relationship of the motion, neither high accuracies of the measurements.

This system finds restricted applications and has, because of causes inherent in the system, a lower stability because of the yielding and the wear and tear of the strings or the like.

The informatory principle of the instant invention, at the limit, could find solution in this system, through the use, instead of the plaited strings or the like, of only a thread having a very small diameter wound through an arc less than 360° on the cylindrical or cone frustum pinion so as to ensure the coupling, strictly on the circumference of only a cross section of the pinion. In practice, however, because of easily conceivable reasons of mechanical and practical limitations such a solution when embodied would generate other greater difficulties and limitations in the utilization of the system.

C. Under the assumption set forth about the informatory principle of the present invention and under the assumption that from the examples A and B mentioned above there results apparent that these systems can, to the limit only, be brought back to the informatory principle, there is taken into account, for the objects of the instant invention, the following coupling system, which worked out from a common chain mechanical transmission system, is being brought back, within determined limits and through the right transformations, to the informatory principle of the present invention, in the following manner:

Gear/chain coupling a. this system can be identified with the type (A) coupling only when the chain is tangent at a point and does not wrap the toothed wheel.

b. being assumed that the chain is tangent at many points and wraps the toothed wheel through an arc of $360° - X°$ (where $X°$ is any positive number set forth in degrees of less than 360°), the chain becomes tangent on the pitch circumference (P) of the teeth of the gear through an arc of $360° - X°$. Under the assumption of what disclosed above and assumed $P/N = \to 0$, as in the case (A) there follows: for a) the pitch circumference (P) remains unchanged and its circumference coincides only and always with the circumference of the pinion (gear with $P/N = \to 0$) tangent on the surface of the bar or tape or strap (ex chain with $P/N = \to 0$) coupled thereto by contact on a generatrix; for b) assumed $P/N = \to 0$ the coincidence of the circumference generated by the pitch circumference (P) with the circumference generated by the tangency with the bar (ex chain with $P/N = \to 0$) coupled thereto is occurring only when the tape has a thickness $S = 0$.

This solution at the limit $S = \to 0$ is the only one which guarantees the absolute linearity of the relationship of the coupling and is the only condition which practically cannot be embodied because of the impossibility of manufacturing tapes with the thickness $S = 0$.

For whichever any other thickness ($S'$ larger than 0) of the belt for the coupling with the pinion ($P/N = 27\ 0$) the circumference generated by P coincides with the surfaces contacted by the two coupled members and is always lower than the circumference generated by real coupling pitch circle ($P'$) which is located in the section of the belt (of a thickness ($S'$). Inasmuch as there is no coincidence of the circumferences generated by $P$ and $P'$, at the limit, the maximum error of linearity of relationship of the coupling and therefore of the shifted motions will be related to the variation of the gap $P' - P$.

In the case of very small thicknesses of the belt with respect to ($P$), the ($P'$) is located about at the middle point of the thickness ($S'$) of the belt itself, so that:

$P' = P + S'/2$ and because $P' - P =$ constant for $\Delta S' = 0$, it follows that the linearity of the coupling relationship is depending only on the variation of the thickness $S'$ of the belt.

In this case it is assumed that both the surfaces being contacted by the pitch circle $P$ do obey the condition ($P/N = \to 0$) of surface finish for getting the coupling without continuity breakage.

Out of carried out attempts there have been determined the conditions which in the present state of the art there are deemed optimal as far as the mechanical coupling system described above in point $b$ is concerned and which has proved to be especially simple, of an easy and sparing cost embodiment, when in comparison with other mechanical coupling system, with like characteristics as to accuracy and possible widening of the utilization (which is not necessarily restricted to the rotary transducers).

It has been already explained above (for $b$) that the essential member which establishes the accuracy of the coupling system is represented by the belt (ex chain with $P/N = \to 0$). It is made up of an especial alloy containing the following metals: iron, cobalt, chrome, nickel, molybdenum, tungsten, titanium.

After the drawing, milling, hardening and grinding the piece takes up the configuration of a metal tape, which offers especial metallurgical characteristics, both physical-chemical and of surface ones, such as to become: chemically resistant to weather agents or usually chemical reagents, resistant to oxygen, non-magnetic, unextendable, of a high flexibility, having a very high breaking load, of an undeformed and mirror-like surface. The border of the tape, furthermore, should not have sharp corners and should have size, width and thickness comprised within very close tolerances, (amending the errors of the milling through a grinding operation).

As from the informatory principle of the present invention, in order to guarantee that there is no continuity breakage in the coupling system between pinion and metal strap (or tape) their contacting surfaces should be ground and at the limit lapped and mirror-like ($P/N = \to 0$).

The friction between the two mirror-like surfaces (greases removed from the surfaces) is increased by increasing the tension on the belt which is wrapped through less than 360° on the pinion. Differing from the gear/rack coupling system, the system herein disclosed has no limitation as to the length of the displacement and therefore in the continuity of the coupling, it being automatic that the coincidence of the pitch circles between rack and pinion in this case is kept unchanged ($P' - P = S'/2$) within the tolerance limits of the thickness of the belt ($S'$) and independently, within a large range, from other variations of the coordinates of the translation motion.

A disadvantage of the belt system is represented by the lower receptivity to accelerations and retardations with respect to impacts when compared to the conventional gear/rack system, particularly when the tape should pilot bulky mass pinions. Such a fault, however, from the practical standpoint is not suffered when the system is being utilized for the coupling of rotary transducers for the measurement of magnitudes and movements or for other application according to the limits given by the instant invention.

On the contrary through the belt coupling system there are the following advantages:

1. Life almost endless in the same starting accuracy order, of the linearity of the relationship of the coupling;

2. Absence of linearity error at short intervals (tooth/tooth) therefore possibility of measuring through infra-hundredth interpolation with a very high accuracy degree;

3. Easiness of offsetting the temperature and the fine zero setting of the coupling ratio;

4. Utilization of the system both for the transduction of the straight displacements and of the polar displacements;

5. Utmost simplicity of equipment and mounting.

Figure 3:
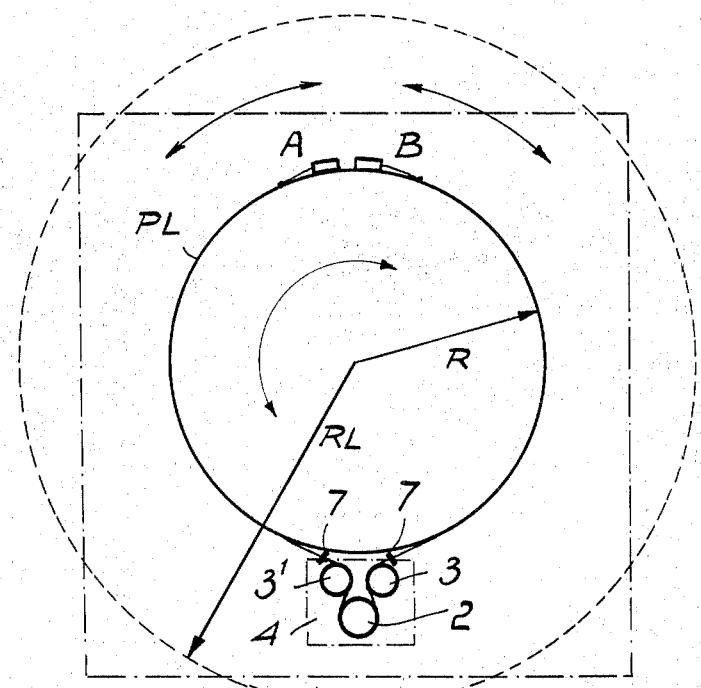

To an illustrative and not limiting purpose there will be disclosed hereinafter three of the more common types of coupling practiced by means of the system, which is the subject matter of the invention, and with reference to the accompanying drawings, in which:

FIGS. 1 and 1A show the principle of the coupling system of the belt with the pinion (of the transducer, for example), FIG. 2 shows, generally, another way of embodiment of the belt coupling system for linear displacements, when owing to space reasons or because of other technical reasons the mounting in situ on the machine is not possible, FIG. 3 shows in the main the way of coupling the belt system in the case of polar displacements. The system shown in FIG. 3 from the principle stand-point does not differ from the system shown in FIG. 1, and for this reason it is not disclosed in detail.

In FIGS. 1 and 1A, the belt kept stretched at the ends, passes through, as indicated in FIG. 1. the group (Gr.Acc) comprising the guiding and coupling members.

The pinion 2 has slightly conical longitudinal section (slope about 1 percent) in order to allow, by means of slight to and fro displacements of the cone, the positioning of the belt 1 on the circumference of the theoretical pitch circle P.

The rollers 3 and 3' are two rollers for the positioning and the sliding of the belt at right angles to the axis of the pinion 2.

The block 4 supports the rollers 3 and 3', in a registered manner, and the transducer TR, so as to allow the variation of position in the axial direction. By way of example there is indicated a registering (Reg. TR) as thread, which, however, may be practiced in another way, for instance, through studs, slipping slides and other running systems.

The block 4 is usually fastened on a stationary machine part or the like, or on a movable portion — slide, car, slipping board, bed and the like — the position or the displacements thereof, with regard to a reference point of the machine or of a piece being worked or the like, are desired to be noted.

The blocks 5 (stationary) and 6 (adjustable) are the blocks for securing the ends of the belt 1. The block 6 should allow (by means of a screw adjustment or an eccentric pawl or the like) the stretching of the belt 1 so that the lengths AC and DB are into an axial extension that is to say, into the side direction of the belt.

SL and BC are, only by way of instance, respectively: SL a slipping board and BC a stationary bed of a machine on which the block 4 is fastened;

Likewise SL and BC can be considered as inverted in their functions without jeopardizing the functionality the principle of the belt coupling system.

From the standpoint of the principle the system shown in FIG. 2 does not differ from that illustrated in FIG. 1, but for the fact that the lengths AC and DB of the belt, instead of being in axial extension, are extending out in parallel relationship with respect to the exit of the coupling device.

In FIG. 2, with BC there is indicated the stationary bed of a machine, with SL the movable device. With 1, 2, 3, 3', 4, 5 and 6 there are shown the members corresponding to those indicated through the same reference signs, in FIG. 1. Through R there are indicated the guiding and transmission rollers.

Taking into account FIG. 3:

Case 1. The coupling system causes the stretched tape between A and B to run on the outside of the rotary plate PL or into a groove formed with in the outer circumference thereof.

Case 2. It is like the Case 1) but for the fact that the coupling system is being located underneath the round plate of half-diameter RL in a proper circular groove with a minimum half-diameter R and maximum radius RL or lower.

The experiments on the prototypes shown in FIGS. 1 – 2 – 3 have confirmed the benefits and the advantages disclosed above, besides the uncommon linearity of the relationship of the transduction of the linear movement (displacement of the belt) and angular movement (rotation of the pinion) which is of the same order of magnitude of accuracy as well as that of the encoders and of the rotary generators of pulses.

In the examples as disclosed above, the following dimensions and features have been resorted to: for the belt 1: tape of steel having the characteristics previously shown and having the following dimensions and tolerances:

Cross-section: rectangular with rounded corners

Total width = 1.08mm. $^{+0}_{-0.02}$

Thickness = 0.08 mm ± 0.001
Surface roughness = ~ 1 micron
Tension on the tape = > 60 kg mm$^2$ The pinion 2: It has been made up of an undeformable steel ring having a content of chrome of 13 percent (hardened and tempered at 60 HRC) ground inner/outer and hot coupled to a duralumin core which is drilled for lowering the weight.

Dimensions of the finished pinion (coupled):
$\phi$ max = P + 0.01 mm
$\phi$ Pitch (0) = 25.78 mm
$\phi$ min = P − 0.01 mm
Pinion length = 15 mm
Surface roughness = ~ 1 micron
Eccentricity $\phi$ inner/outer = 6 micron

We claim:

1. A system of mechanical coupling, without continuity breakage, for the transduction of linear and polar displacements and magnitudes into angular displacements and magnitudes, comprising a smooth metal tape, a transducer, a pinion rotatably mounted on said transducer and located between the ends of said tape, means for securing the opposite ends of said tape, said tape wrapped on said pinion through an arc of less than 360°, said pinion having a smooth surface on which said tape is wrapped, said tape having a rectangular cross-section and the area of the rectangular cross-section being less than 1 square millimeter and the width of the cross-sectional area being in the range of ten to twenty times the thickness of the cross-sectional area, said pinion having a diameter as great as a hundred times the thickness of said tape, wherein a high degree of linearity in the relationship between the two displacements or magnitudes is obtained.

2. A coupling system as claimed in claim 1, wherein the rectangular cross-section of said tape has the corners rounded off.

3. A coupling system as claimed in claim 1, wherein two grooved rollers are spaced apart from one another with their axes in parallel relation and the grooves in the same plane, said rollers located adjacent and disposed outwardly from the periphery of said pinion, the axes of said rollers disposed in parallel relation with the axis of said pinion so that said rollers act as slides to engage and guide the wrapping of said tape on said pinion.

4. A coupling system as claimed in claim 1, wherein said transducer is axially displaceable for effecting the adjustment of the pitch circle (P) of the tangency between said tape and said pinion.

5. A coupling system as claimed in claim 1, wherein the transverse cross-section of said tape has a width of 1.08 mm, a thickness of 0.08 mm, and a surface roughness of about one micron.

6. A system of mechanical coupling as claimed in claim 1, in which the tape is made up of a hardened stainless alloy steel containing fire resistant metals, including cobalt, chrome, nickel, molybdenum, tungsten and titanium, and.

* * * * *